UNITED STATES PATENT OFFICE.

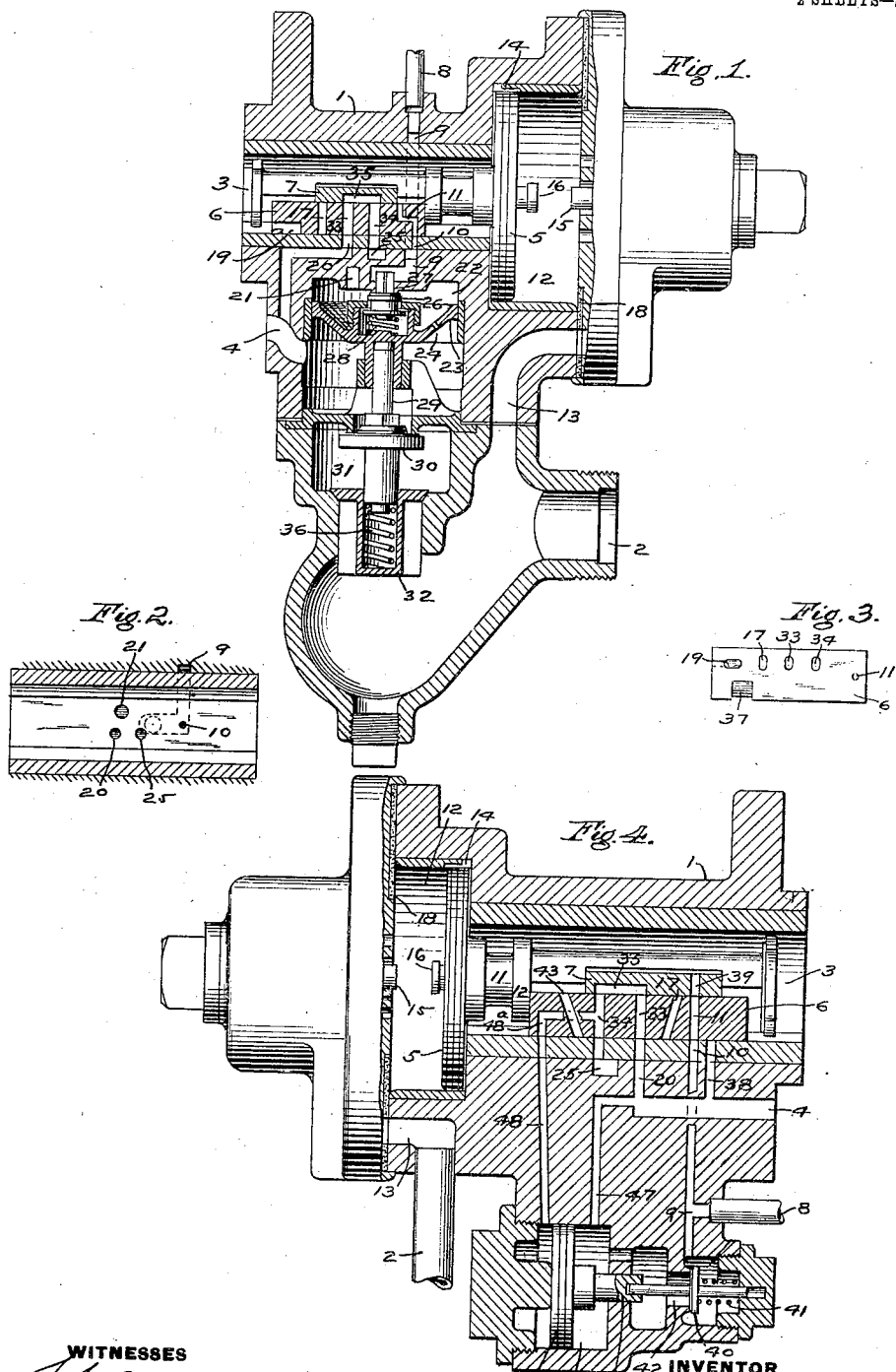

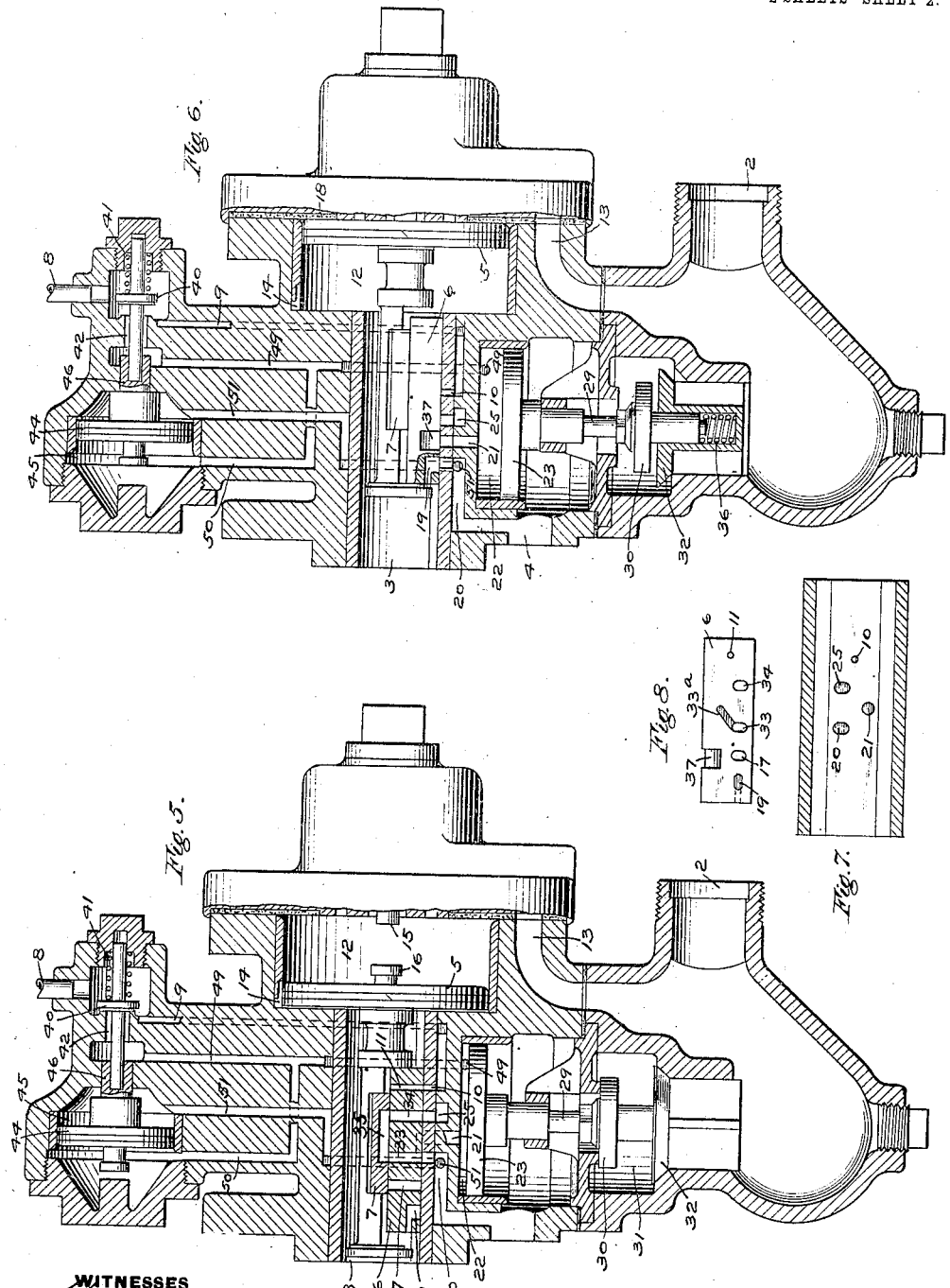

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

No. 917,194.　　　　Specification of Letters Patent.　　　　Patented April 6, 1909.

Application filed July 20, 1906. Serial No. 327,054.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to automatic fluid pressure brakes for railway cars; and comprises new and improved means for supplying fluid under pressure from an additional source, for the purpose of reinforcing the pressure admitted to the brake cylinder in making a high pressure application of the brakes; and it further comprises the combination with such means of a quick action or emergency device for effecting a quick and powerful application of the brakes.

My invention provides, in combination with a train pipe, auxiliary reservoir, and a triple valve device, a supplemental reservoir, or other additional source of fluid pressure, from which fluid may be discharged in applying the brakes, a separate or supplemental valve for controlling the flow of fluid from the supplemental reservoir, or other additional source, and a piston for actuating the separate valve, which is normally exposed to atmospheric pressure on its opposite sides and which is moved by pressure from the auxiliary reservoir to open the separate or supplemental valve. In accordance with my invention, the piston of the separate or supplemental valve device may be employed to actuate a quick action or emergency valve device, or the separate piston and valve device may be employed with or without an independent quick action or emergency valve device.

In the accompanying drawings, which illustrate my invention, Figure 1 is a central section through a quick action triple valve device embodying my invention; Fig. 2 a plan view of the seat of the main valve of the triple valve device shown in Fig. 1; Fig. 3 a face view of the main slide valve; Fig. 4 a section through a triple valve device and a modification of my improvement; Fig. 5 a vertical section through a quick action triple valve device showing another modification of my invention; Fig. 6 a similar view showing the parts in emergency position; Fig. 7 a plan view of the slide valve seat; and Fig. 8 a face view of the main slide valve of the latter modification.

In Fig. 1 of the drawings, my improvement is shown in combination with a quick action triple valve device for releasing fluid under pressure from the train pipe to the brake cylinder in emergency applications of the brake. The triple valve casing, 1, has the usual connections to the train pipe, auxiliary reservoir, and brake cylinder; the nozzle 2 being connected with the train pipe; the valve chamber, 3, opening to the auxiliary reservoir; and the passage 4 opening to the brake cylinder, when the triple valve device is in place in the automatic brake apparatus. The parts are all shown in release position. The pipe 8 leads from the supplemental reservoir, or other additional source of fluid pressure, and connects with a passage, 9, formed in the casing around the valve chamber 3; and a port 10, formed in the seat of the main slide valve, registers with a port 11 in the main slide valve 6, and through these ports the passage 9 and the supplemental reservoir are connected with the chamber 3 and with the auxiliary reservoir when the parts are in release position and the port 11 uncovered by the graduating valve 7, as shown in the drawing. The triple valve device is charged with fluid under pressure in the usual way, through the nozzle 2, passage 13, piston chamber 12, feed groove 14, and valve chamber 3; and the supplemental reservoir may be charged with fluid, from chamber 3 and the auxiliary reservoir, through ports 11, 10, passage 9, and pipe 8.

In applying the brakes, in service and emergency applications, the ports 10 and 11 are closed by movement of the main and graduating valves to the right. In service applications, when the piston 5 is moved to the right so that the short stem 16 makes contact with the usual spring-pressed stem 15, the graduating and main valves are moved so as to close the exhaust passage from the brake cylinder to the atmosphere and to open communication, through port 17, from the chamber 3 to the brake cylinder passage 4. When the triple valve piston is moved to the limit of its stroke to the right, so as to make contact with the gasket 18, the port 19 in the main valve registers with the port 20 opening to the brake cylinder passage 4; the main slide valve, which has a part 37 cut away on one side, uncovers the port 21, and fluid from chamber 3 and the auxiliary reservoir is charged into the chamber 22, above the supplemental piston 23. The supplemental piston 23 is normally exposed on its opposite sides to atmospheric pressure, that is, when the parts are in release position; the space below the piston being in communication with the brake cylinder and the exhaust port, 25, through the ports and passages 4, 20, 33, 35 and 34, and the small passage 24 through the piston 23 permits the pressures on its opposite sides to equalize. When the fluid from the auxiliary reservoir is admitted through the port 21 to the upper side of the piston 23, the piston is moved downward, and with it the valve 26, which is connected with the piston, and which normally closes a port 27 for connecting the passage 9 with the chamber 22. When the valve 26 is opened, fluid under pressure flows from the supplemental reservoir, through pipe 8, passage 9, and port 27, into chamber 22, and thence through passage 21 into triple valve chamber 3 and auxiliary reservoir; and the supplemental reservoir pressure equalizing with the auxiliary reservoir and brake cylinder pressures produces a high pressure application of the brakes. When the triple valve piston 5 is moved to the left to release the brakes, the parts will again occupy the positions shown in Fig. 1; communication between the supplemental reservoir and the auxiliary reservoir through the passage 21 will be closed by the main slide valve 6 and the valve 26, and opened through the ports 11, 10, passage 9, and pipe 8, and the supplemental reservoir will be recharged through these connections.

The valve 26 which controls the discharge of fluid from the supplemental reservoir, through chamber 22 and passage 21, to the auxiliary reservoir, is loosely connected with the piston 23, to permit the valve to seat properly, and the valve is held to its seat by the spring 28 which bears at one end against the piston 23. The piston 23 bears on the upper end of the stem 29 of a valve 30 which is normally held to its seat by the pressure of fluid in the chamber 31 and by the pressure of a spring 36 which is located between it and the check valve 32, as in the well known Westinghouse quick action triple valve for releasing fluid from the train pipe to the brake cylinder. When the piston 23 is moved downward, by the admission of auxiliary reservoir pressure to the chamber 22, through the passage 21, in quick action or emergency application of the brake, the valve 30 and the valve 26 are both unseated; the fluid in the chamber 31 is released to the brake cylinder; the train pipe pressure opens the check valve and fluid under pressure is discharged from the train pipe to the brake cylinder. When the train pipe pressure is nearly equalized with the brake cylinder pressure, the check valve 32 closes, but the valves 26 and 30 remain open until the equalized pressure above and below the piston 23 permit the closure of these valves by the springs 36 and 28 acting on them.

In Fig. 4 of the drawings, I have shown a modification of my invention in connection with a plain triple valve device having no train pipe release valve, but this construction may be employed either with or without means for releasing fluid from the train pipe in quick action or emergency applications of the brakes. The triple valve device is connected as usual with the train pipe through a branch pipe 2; with the brake cylinder through a passage 4; and the valve chamber 3 is in open communication with the auxiliary reservoir as above described. According to this modification a separate piston 44 in chamber 45 and having a stem 46 actuates the separate valve 40 for controlling the supply of fluid from the supplemental reservoir or other additional source through pipe 8 and passages 9, 42, 47 and 20 to outlet 4 and the brake cylinder. The piston 44 is usually subject to atmospheric pressure through ports 48, 48$^a$, 34 and 25 on one side, and through ports 47, 20, 33, 35 and 34 on the other side when the triple valve is in release position as shown in the drawing. The graduating valve 7 has a port 39 normally communicating with port 11 and the additional source of fluid pressure, and the main valve 6 is provided with an additional port 43, otherwise the construction of the triple valve device is similar to that shown in Fig. 1, except that the quick-action parts are dispensed with and an additional port 38 is shown for supplying fluid from the auxiliary reservoir to the brake cylinder in emergency application. In making a service application of the brake, the triple valve piston 5 moves to the left until the short stem 16 makes contact with the stem 15; the graduating valve 7 moves on the main slide valve 6 so as to disconnect the ports 33 and 34 and to close the port 11 in the main slide valve and bring the port 39 in register with the port 17. The main slide valve is moved to the left so as to close the upper end of the passage 48 and to cut off the exhaust passage 25 and to open the port 17 to the brake cylinder passage 20. Fluid will then flow from the chamber 3 and the auxiliary reservoir through ports 39 and 17 in the graduating and main valves, and through passage 20 to the brake cylinder. The brakes are released by increasing the train pipe pressure sufficiently to return the triple valve piston and the graduating and main valves to the positions shown in the drawing. In making such an application of the brakes, the piston 44 of the separate valve device will be exposed to brake cylinder pressure as the right hand end of the chamber 45 communicates with the brake cylinder through the passage 47; but the piston 44 will remain in the position shown in the drawing. In making a high pressure or emergency application of the brakes, the train pipe pressure is reduced sufficiently to permit the auxiliary reservoir pressure to move the piston 5 to the limit of its stroke to the left so that it will bear on the gasket 18. The graduating valve and the main slide valve will then be moved to the left so as to cut off the exhaust from the brake cylinder to the atmosphere; the upper end of the passage 10 through which the supplemental reservoir is charged will be closed; the passage 38 will be uncovered, and fluid from the auxiliary reservoir will flow through passages 38 and 4 to the brake cylinder; and at the same time the passage 43 in the main valve will be in position to register with the passage 48 leading to the left hand end of the piston chamber 45. Fluid from the auxiliary reservoir will then move the piston 44 to the right; the valve 40 will be unseated and fluid under pressure from the supplemental reservoir will flow through pipe 8, passages 9, 42, 47, and 4 to the brake cylinder and the equalized pressure in the two reservoirs and the brake cylinder will be higher than the equalized pressure of the auxiliary reservoir and brake cylinder obtained in other applications of the brake. When the pressures on opposite sides of the piston 44 have equalized the valve 40 will be closed by the pressure of the spring 41; and when the parts are returned to release position, the supplemental reservoir will be recharged through the passages 39, 11, 10, 9 and pipe 8; and the brake cylinder pressure will be released to the atmosphere through ports 20, 33, 35, 34 and 25.

According to the modification shown in Figs. 5 and 6 of the drawing, the form of my improvement embodying the separate piston and valve is applied to a triple valve device of the quick action type, that is, having an emergency piston and valve for locally venting or releasing fluid from the train pipe for quickening the action of the valves in emergency applications of the brakes. As shown in the drawing the port 42 which is controlled by the separate valve 40, communicates with the chamber 22 above the emergency piston 23 and this chamber also communicates by port 50 with the chamber 45 on one side of piston 44 while the space on the opposite side of piston 44 is in open communication with the brake cylinder through ports 51 and 20. The operation of this form of my improvement in service application of the brake is the same as that described with reference to Fig. 1 of the drawing, there being no movement of the emergency valve nor of the separate valve device. When a sudden reduction in train pipe pressure is made for an emergency or high pressure application of the brakes the triple valve piston 5 makes its complete traverse to the position shown in Fig. 6, thereby moving the slide valve to register port 19 and 37 with ports 20 and 21 respectively in the valve seat and causing the action of the piston 23 and emergency valve 30 as before described for releasing fluid from the train pipe to the brake cylinder. At the same time fluid under pressure from the auxiliary reservoir will flow from port 21 and chamber 22 through ports 49 and 50 to chamber 45 on one side of piston 44, moving the same to open valve 40 and supply fluid from the supplemental reservoir or other additional source through ports 42 and 49 to the chamber 22 and through port 21 to the auxiliary reservoir, there reinforcing and augmenting the equalized pressure admitted to the brake cylinder. As soon as the brake cylinder pressure has equalized with that of the auxiliary reservoir and supplemental supply the piston 44 will be balanced as to fluid pressure and the spring 41 will expand to move the piston and close the valve 40. The port 33 in the main slide valve may be provided with an extension 33$^a$, so that when the triple valve device is returned to release position the chamber 45 on the left of piston 44, and also the chamber 22 will be open to the atmosphere through ports 21, 33$^a$, 33, 35, 34 and 25, thereby providing a free escape of any fluid which may be admitted to chamber 22 by leakage or otherwise with the valve in this position.

It will now be apparent that the piston for operating the separate valve is normally subject to atmospheric pressure and is actuated by the supply of fluid under pressure to one side thereof to open communication from the additional fluid pressure supply either directly to the brake cylinder, as shown in Fig. 4 in connection with a plain type of triple valve, or indirectly through the auxiliary reservoir, as shown in the other modifications in connection with quick action triple valves. In this way the flow from the additional source of fluid pressure to the brake cylinder is sufficiently restricted as not to interfere with the venting of fluid from the train pipe to the brake cylinder which is necessary to produce quick action of the valves in emergency applications.

I claim as my invention and desire to secure by Letters Patent,

1. In an automatic fluid pressure brake the combination with a train pipe, auxiliary reservoir, an emergency valve for venting fluid from the train pipe, triple valve, and brake cylinder, of an additional source of fluid pressure, a separate valve for controlling the supply of fluid from said additional source to augment the brake cylinder pressure, a piston normally subject to atmospheric pressure for actuating said valve, and means for supplying fluid under pressure from the auxiliary reservoir to one side of said piston for effecting the opening of the separate valve.

2. In an automatic fluid pressure brake the combination with a train pipe, auxiliary reservoir, triple valve and brake cylinder, of an additional source of fluid pressure, a separate valve for controlling the supply of fluid from said additional source to the auxiliary reservoir to augment the brake cylinder pressure in applying the brakes, a piston normally exposed on opposite sides to atmospheric pressure for actuating said valve, and means governed by the movement of the triple valve for supplying fluid from the auxiliary reservoir to one side of said piston to effect the opening of the separate valve.

3. In an automatic fluid pressure brake apparatus, the combination, with an auxiliary reservoir and a triple valve device, of a supplemental reservoir having means for charging same from the auxiliary reservoir, a separate valve controlling the flow of fluid from the supplemental reservoir in applying the brakes, and a piston, which is normally exposed on its opposite sides to atmospheric pressure, and which is actuated by auxiliary reservoir pressure to effect opening movement of the separate valve.

4. In an automatic fluid pressure brake apparatus, the combination, with an auxiliary reservoir, a brake cylinder and a triple valve device, of an additional source for supplying fluid under pressure to the auxiliary reservoir in applying the brakes, a passage through which fluid is supplied from the supplemental reservoir to the auxiliary reservoir and which is controlled by the triple valve, and a separate valve controlling communication between the additional source of fluid pressure and the passage.

5. In an automatic fluid pressure brake apparatus, the combination, with an auxiliary reservoir, a brake cylinder, and a triple valve device, of a supplemental reservoir, passages controlled by the triple valve for supplying fluid to and discharging it from the supplemental reservoir, and a separate valve controlling communication between the supplemental reservoir and the passage through which the fluid from the supplemental reservoir is discharged.

6. In an automatic fluid pressure brake apparatus, the combination, with an auxiliary reservoir, a brake cylinder, and a triple valve device, of a supplemental reservoir, a passage through which fluid is discharged from the supplemental reservoir to the auxiliary reservoir in applying the brakes, a separate valve for controlling the discharge of fluid from the supplemental reservoir and a piston for operating the separate valve, and which is actuated by fluid under pressure admitted thereto by the triple valve device.

7. In a fluid pressure brake, the combination with a train pipe, auxiliary reservoir, brake cylinder and a quick action triple valve device having means for venting fluid from the train pipe to the brake cylinder in emergency applications, of an additional source of fluid pressure, a separate valve for controlling the supply of fluid from the additional source to augment the brake cylinder pressure in emergency applications, and means for retarding the flow from such additional source so as not to interfere with quick action.

8. In a fluid pressure brake, the combination with a train pipe, auxiliary reservoir, brake cylinder, and a quick action triple valve device having means for venting fluid from the train pipe to the brake cylinder in emergency applications, of an additional source of fluid pressure, and a separate valve for controlling the supply of fluid from the additional source to the auxiliary reservoir in emergency applications.

9. In a fluid pressure brake, the combination with a train pipe, auxiliary reservoir, brake cylinder, and a quick action triple valve device having means for venting fluid from the train pipe to the brake cylinder in emergency applications, of an additional source of fluid pressure, a separate valve for controlling the supply of fluid from the additional source to augment the brake cylinder pressure in emergency applications, a piston for actuating said separate valve, and means for supplying fluid to one side of said piston, and for retarding the flow from said additional source to the brake cylinder in emergency applications.

10. In a fluid pressure brake the combination with a train pipe, auxiliary reservoir, brake cylinder, and a quick action triple valve device having an emergency valve for venting fluid from the train pipe to the brake cylinder in emergency applications, of an additional source of fluid pressure, a separate valve for controlling the supply of fluid from said additional source to augment the brake cylinder pressure in emergency applications, pressure actuated mechanism for opening said emergency and separate valves, and means governed by the movement of the triple valve for supplying fluid to said pressure actuated mechanism.

11. In a fluid pressure brake the combination with a train pipe, auxiliary reservoir, brake cylinder, and a quick action triple valve device having an emergency valve for venting fluid from the train pipe to the brake cylinder in emergency applications, of an additional source of fluid pressure, a separate valve for controlling the supply of fluid from said additional source to the auxiliary reservoir, pressure actuated mechanism for opening said separate and emergency valves, and means governed by the movement of the triple valve for supplying fluid to said pressure actuated mechanism.

12. In a fluid pressure brake the combination with a train pipe, auxiliary reservoir, brake cylinder and a quick action triple valve device having an emergency valve for venting fluid from the train pipe to the brake cylinder in emergency applications, of an additional source of fluid pressure, a separate valve for controlling the supply of fluid from said additional source to the auxiliary reservoir and a piston operated by fluid pressure for opening both said separate and emergency valves in emergency applications.

13. In an automatic fluid pressure brake apparatus, the combination, with an auxiliary reservoir, a brake cylinder, and a triple valve device, of a supplemental reservoir for supplying fluid under pressure to the auxiliary reservoir in applying the brakes, a separate valve for controlling the discharge of fluid from the supplemental reservoir, a piston for actuating the valve, and a train pipe discharge valve actuated by the piston.

14. In an automatic fluid pressure brake apparatus, the combination, with an auxiliary reservoir, a brake cylinder, and a triple valve device, of a supplemental reservoir, a passage controlled by the triple valve for supplying fluid under pressure to the supplemental reservoir, a passage controlled by the triple valve device for releasing fluid from the supplemental reservoir, a separate valve controlling communication between the supplemental reservoir and the passage through which fluid is discharged from the supplemental reservoir, a piston for actuating the separate valve, and a quick action or emergency valve actuated by the piston.

15. In a fluid pressure brake the combination with a train pipe, auxiliary reservoir, triple valve, and brake cylinder, of an additional source of fluid pressure, a valve for controlling the supply of fluid from said additional source to the auxiliary reservoir to augment the brake cylinder pressure, a piston for actuating said valve, and means operated by the movement of the triple valve for supplying fluid under pressure to one side of said actuating piston.

In testimony whereof I have hereunto set my hand.

WALTER V. TURNER.

Witnesses:
E. A. WRIGHT,
F. H. PARKE.